Feb. 14, 1967  A. F. GRANT, JR., ET AL  3,303,651
NUCLEAR ISOTOPE MONOPROPELLANT HYDRAZINE ENGINE
Filed May 29, 1963  2 Sheets-Sheet 1
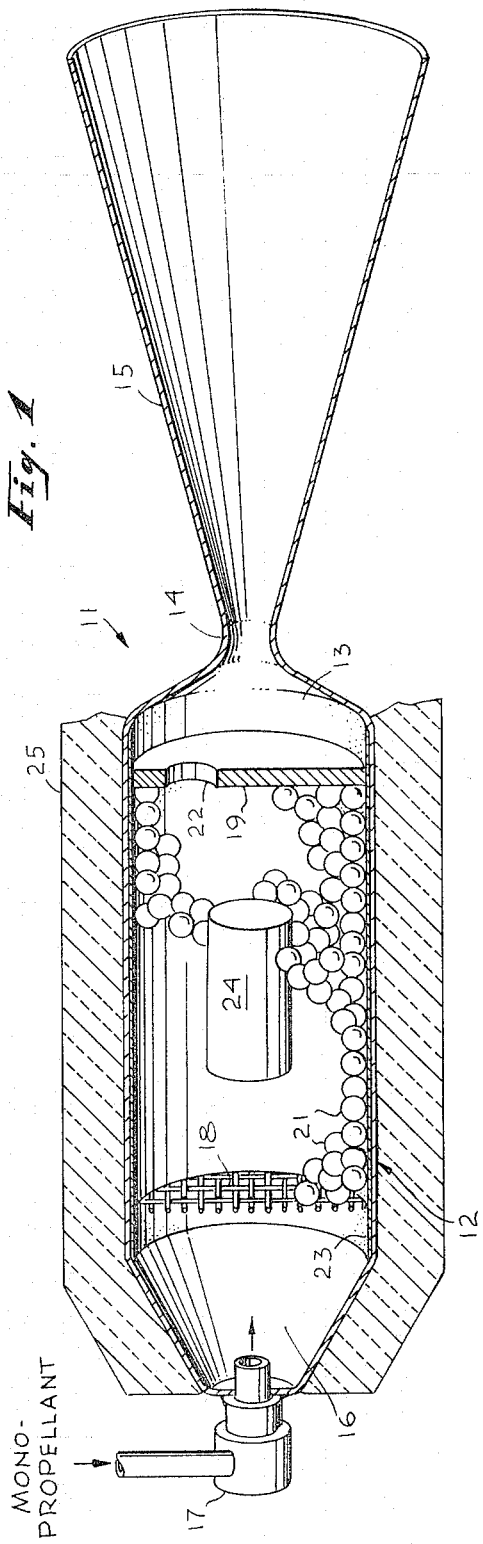
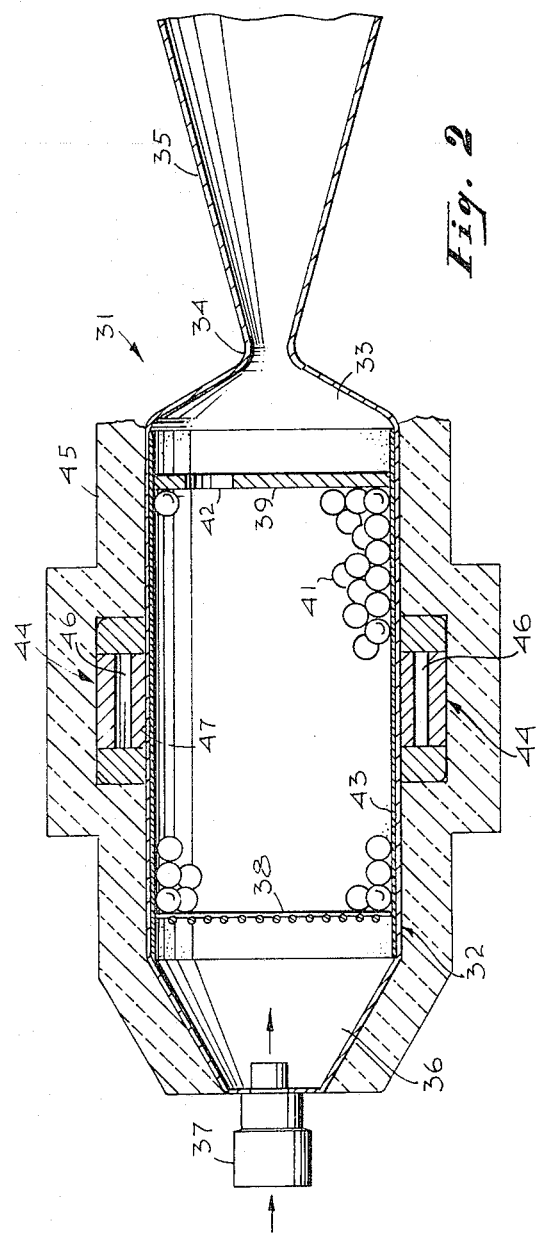
ARTHUR F. GRANT, JR.
JOHN S. MARTINEZ
INVENTORS
BY
E. Hayward Marshall
AGENT Feb. 14, 1967  A. F. GRANT, JR., ETAL  3,303,651
NUCLEAR ISOTOPE MONOPROPELLANT HYDRAZINE ENGINE
Filed May 29, 1963  2 Sheets-Sheet 2
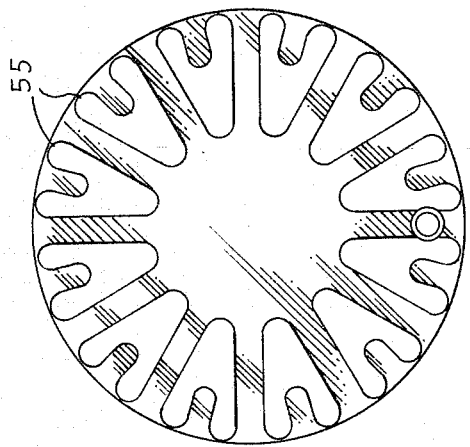
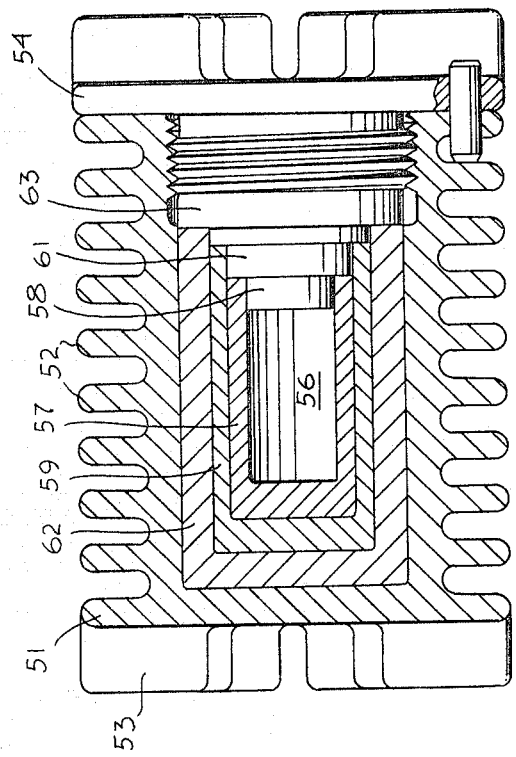
ARTHUR F. GRANT, JR.
JOHN S. MARTINEZ
INVENTORS
BY
E. Hayward Marshall
AGENT

3,303,651
NUCLEAR ISOTOPE MONOPROPELLANT HYDRAZINE ENGINE
Arthur F. Grant, Jr., Palos Verdes Estates, and John S. Martinez, Redondo Beach, Calif., assignors, by mesne assignments, to TRW Inc., a corporation of Ohio
Filed May 29, 1963, Ser. No. 284,082
11 Claims. (Cl. 60—203)

This invention relates to liquid propellant rocket engines and gas generators which employ a nuclear isotope heat source for initiating the decomposition of monopropellants or the reaction of non-hypergolic bipropellants. More particularly the invention relates to monopropellant rocket engines which employ encapuslated radioisotope heat sources to supply the energy necessary to initiate the monopropellant decomposition reaction, thereby providing rapid and predictable start transients. The use of the isotope heater will also result in higher $I_{sp}$ values in reaction control motors, where firing is intermittent and for very short periods. This invention also relates to a nuclear heated bipropellant engine which employs an encapsulated radioisotope heat source to supply the energy of activation necessary to initiate the chemical reaction between non-hypergolic liquid bipropellants.

At the present time, monopropellant hydrazine engines must be preheated to a temperature in excess of 500° F. in order to obtain ignition. Preheating may be accomplished by means of electrical resistance coils, but these have excessive power requirements, which would drain the power supply on a spacecraft. Another system utilizes bipropellant operation with a hypergolic oxidizer, such as nitrogen tetroxide, for approximately the first half second or rocket firing, but the bipropellant system requires a separate injection and an oxidizer storage system for multiple restarts during operation.

Other systems under development utilize spontaneous catalysts to initiate autodecomposition, but while these catalysts will function at ambient temperatures, preheating is required in order to achieve rapid ignition transients, and thus provide rapid predictable restarts.

Because of their relative simplicity, monopropellant rocket engines utilizing $N_2H_4$ and

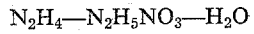
$$N_2H_4—N_2H_5NO_3—H_2O$$

mixtures are ideal for use as attitude control and vernier velocity engines in the intermediate (5000–100,000 p.s.i.) total impulse range. Their major drawback has been the lack of a simple restart capability.

Briefly stated, one preferred embodiment of the rocket engine of the present invention consists of a reaction chamber preferably enclosing a catalyst bed with means for injecting one or more propellants at one end of the reaction chamber and an exhaust nozzle connected to the opposite end of the reaction chamber. An encapsulated alpha or beta emitting radioisotope heat source is employed to supply the heat required to initiate the decomposition or chemical reaction. This radioisotope heat source for a monopropellant rocket engine can either be embedded in the reaction chamber catalyst bed, or otherwise located in thermal contact with the reaction chamber and catalyst bed in order to heat the bed to the temperature level necessary to achieve autodecomposition with the necessary rapid ignition transients required for the particular mission. For a bipropellant rocket engine the catalyst may not be necessary and the radioisotope heat source can be located at any desired position within the reaction chamber or in thermal contact therewith.

Although beta emitting sources can be employed for this purpose, encapsulated alpha sources are preferable because of their negligible external nuclear radiation field. The choice of a particular radioisotope will depend on the particular mission, considering the acceptable level of radiation, the mission lifetime and the total heat energy required to maintain the reaction chamber and catalyst bed at the proper temperature for rapid multiple restarts.

One object of the present invention is to provide a simple, reliable, restart capability for liquid propellant rocket engines which does not require an onboard electrical power supply.

Another object of the present invention is to provide a new rapid restartable monopropellant rocket engine which utilizes an alpha or beta emitting radioisotope for heating the catalyst bed to initiate autodecomposition and achieve rapid ignition transients.

A further object of the present invention is to provide a monopropellant rocket engine which maintains the catalyst bed at a high temperature for reducing the duration and uncertainty of the start transient, and also to deliver significantly higher specific impulse than unheated pulsed systems using the same monopropellant, particularly for applications such as attitude control and vernier velocity engines requiring short bursts of thrust at infrequent intervals.

Other objects and many of the intended advantages of this invention will be readily appreciated as the same becomes better understood by reference to the following detailed description when considered in connection with the accompanying drawings wherein:

FIG. 1 is a longitudinal sectional view illustrating one preferred embodiment of the present invention with the radioisotope capsule embedded in the catalyst bed;

FIG. 2 is a longitudinal sectional view illustrating one modification of the present invention wherein the radioisotope capsules are placed on the outside of, but in close thermal contact with, the reaction chamber and the catalyst bed;

FIG. 3 is a detailed sectional view on an enlarged scale illustrating one preferred construction of the radioistope capsule which is adapted to (1) withstand impact loads which might result from accidental engine or launch vehicle failure; (2) withstand the high temperature gases in the engine chamber; and (3) to control the pressure of the helium generated by the radioisotope in the capsule and transmit the heat to the catalyst and monopropellant in the reaction chamber; and FIG. 4 is an end view of the capsule shown in FIG. 3.

Referring now to the drawings in detail and more particularly to FIG. 1, illustrating one preferred embodiment of the present invention, the nuclear isotope monopropellant hydrazine engine 11 has a reaction chamber 12 which is cylindrical in shape and formed of some heat resistant metal.

The reaction chamber 12 is integrally formed or connected to the outlet chamber 13 which communicates through the throat 14 with the expansion nozzle or thrust chamber 15.

The opposite end of the reaction chamber 12 communicates with a spray chamber or inlet section 16, which is frusto-conical in shape and is provided with a spray nozzle 17 adapted to be connected to an inlet line (not shown) for the monopropellant fuel such as $N_2H_4$ or $$N_2H_4\text{---}N_2H_5NO_3\text{---}H_2O$$

mixtures.

The reaction chamber 12 is provided with a screen 18 at the inlet end and another supported screen or plate 19 at its outlet end for retaining the catalyst pellets 21 in position within the reaction chamber. If a solid plate 19 is used at the outlet end a suitable opening 22 is provided for egress of the products of decomposition into the outlet chamber 13 prior to expansion through the throat 14 into the nozzle 15.

The internal surface of the reaction chamber 12 is preferably provided with an inner coating of "Rockide" or similar commercially available alumina, or heat resistant insulating coating 23, and the catalyst pellets are preferably an "H–7" catalyst which consists of iron, cobalt or nickel coatings on an alumina pellet or spontaneous catalysts currently under development such as ruthenium, iridium or platinum coatings on alumina, or similar refractory material pellets having high specific surfaces.

The radioisotope capsule 24 is preferably positioned centrally within the reaction chamber 12, but its position may be varied axially in order to control and vary the reaction temperature and regulate the extent of the disassociation of the monopropellant fuel. While a single radioisotope capsule has been shown, a plurality of smaller capsules may be employed and positioned within the catalyst bed as desired, particularly where it is desirable to adjust the temperature profile in the catalyst bed.

The radioisotope capsule 24 will be described in more detail in conjunction with FIGS. 3 and 4, but is designed to withstand impact and the engine gases, and to control the pressure of the helium generated by the radioisotope, and also to transmit the heat generated by the radioisotope efficiently to the catalyst and monopropellant in the reaction chamber.

The reaction chamber 12 and all or portions of the outlet chamber 13 and inlet chamber 16 are preferably covered with a layer of thermal insulation 25 which will retain the heat generated by the radioisotope capsule 24 to maintain the desired temperature within the reaction chamber 12. The thermal insulation reduces heat losses and therefore reduces the quantity of radioisotope required to maintain the desired catalyst temperature.

In the modification of the invention illustrated in FIG. 2, the nuclear isotope monopropellant hydrazine engine 31 is generally similar to the engine shown in FIG. 1 and consists of a reaction chamber 32 communicating through the outlet chamber 33 and the throat 34 with the nozzle or thrust chamber 35.

The spray chamber 36 is also provided with a spray injector 37 for spraying the monopropellant into the reaction chamber 32 through the screen 38. A screen or plate 39 is also provided at the opposite end of the chamber 32, and has an opening 42 through which the products of decomposition flow, after autodecomposition is initiated by the catalyst pellets 41. The reaction chamber 32 may also be provided with a "Rockide" or similar type insulation coating 43 which protects the outer shell of the reaction chamber 32.

In this particular modification several radioisotope capsules 44 are placed on the outside of the thrust chamber 32 but in close thermal contact with the catalyst bed 41. The radioisotope capsules 44 are preferably covered with a layer of insulation 45, which covers all sides of the capsule except that side of the capsule which is in thermal contact with the reaction chamber 32.

In this modification, the heat generated by the radioisotope 46 is transmitted through the walls of the reaction chamber 32 to the catalyst pellets 41 which heat the monopropellant fuel to a sufficiently high temperature to initiate decomposition.

One type of radioisotope capsule 24 is illustrated in more detail in FIGS. 3 and 4 and consists of an outer cylindrical chamber 51 provided with a plurality of annular ridges 52, as well as radial ridges 53 on its closed end. A cap 54 is threaded into the open end of the outer cylindrical container 51 and may also be provided with radial ridges 55 to increase the thermal radiation.

A plurality of concentric containers are provided to enclose the radioisotope material 56 to insure absolute containment of the radioisotope under the severest impact, temperature and chemical conditions and to contain or withstand the high pressure from helium gas which may be generated by the radioisotope 56. The capsule 24, shown in FIGS. 3 and 4, consists of an inner container 57 with a cap 58 welded across the open end, another container 59 with a cap 61 welded across its open end and an optional third container 62 with a cap 63 welded across its open end. The fuel form of the radioisotope should be one which does not exert appreciable vapor pressure at operating temperature. However, it is necessary to provide a relatively heavy capsule, which has sufficient strength and may be formed of molybdenum and tungsten, in order to assure that the capsule is explosion and fireproof and will have the ability to contain the radioisotope heat source material under the severest possible circumstances.

An encapsulated $\alpha$ or $\beta$-emitting radioisotope heat source may be employed to supply the heat required to initiate the decomposition reaction. This source can either be embedded in the thrust-chamber catalyst bed or connected to it by means of high thermal-conductivity bus bars. The thrust chamber is externally insulated to prevent heat loss, and the radioisotope cartridge will be designed to supply heat at a rate equal to the heat loss which occurs when the catalyst bed is at the desired temperature. The initial heat input required to raise the catalyst bed from ambient to operating temperature could be supplied on the ground prior to launch, or it could be supplied by the first firing of the engine which can be initiated spontaneously by certain presently available catalyst coatings.

Depending upon the mission lifetime, the proximity of personnel and/or delicate electronic components and the allowable cost, considerable latitude exists in the choice of the radioisotope. For manned vehicles, an $\alpha$ source is desirable because of the negligible nuclear radiation which will be emitted from the engine. For mission durations less than about one month, Polonium-210 is an ideal choice. For longer-term missions, the more expensive Plutonium-238 is more desirable because of its 85-year half-life. Each of these source materials is a solid at 500° F. and a liquid at the adiabatic flame temperatures encountered in the $N_2H_4$ engine. Polonium is commercially available in .034"-thick 304 stainless-steel containers. Although the source-container shape must be tailored to individual catalyst beds, it is possible in some cases to insert the commercially-supplied 304 stainless-steel capsules into outer molybdenum containers which can then be embedded in the catalyst bed.

The percentage $NH_3$ decomposed is controlled by the quantity of catalyst. Therefore, by varying the catalyst quantity and the position of the source container within the bed, it is possible to control the polonium vapor pressure within the desired capsule design limits. Since the vapor pressure of plutonium is negligible at any possible catalyst temperature, no internal capsule-pressure considerations will be involved for plutonium-heated catalyst beds.

The power requirement, hence isotope quantity, needed for any given engine will depend upon the size of the engine and the heat transfer from the engine during non-operating periods. For most hydrazine monopropellant engines, the power requirement would be of the order of a few watts. The quantity of Polonium-210 required to produce a few watts of heat is extremely small.

The present inventon also has particular advantages with spontaneous catalyst systems for applications which require rapid, predictable start transients for reaction control motors. When employed for on-off operation, unheated spontaneous catalyst systems will have a wide uncertainty in starting transient (ranging from 10 to 400 msecs., or more) because the catalyst bed temperature at the initiation of each firing can vary from ambient temperature up to almost adiabatic flame temperature. By keeping the catalyst bed hot, the present invention reduces both the duration of the start transient and the uncertainty in the transient. This system also reduces the enthalpy loss associated with heating the bed and therefore delivers significantly higher $I_{sp}$'s than unheated systems for applications requiring short bursts of thrust (e.g., 20 or 30 closely spaced 100 millisecond bursts). For many missions (e.g., synchronous satellites) a burst of 40 or 50 pulses every few days may be adequate; hence the bed temperature never levels off. It can be seen that the $I_{sp}$ gain derivable from heating the catalyst bed increases as the number of pulses per burst decreases.

Obviously, many other modifications and variations of the present invention may be made within the scope of the following claims.

What is claimed is:

1. A liquid propellant engine comprising:
(A) a reaction chamber including a catalyst bed;
(B) means for injecting at least one liquid propellant into said chamber;
(C) at least one radioisotope heat source positioned adjacent said reaction chamber and generating sufficient heat energy to maintain said catalyst bed at a temperature sufficient to initiate the rapid reaction of said propellant.

2. A liquid propellant engine comprising:
(A) a reaction chamber including a catalyst bed;
(B) means for injecting at least one liquid propellant into said chamber;
(C) at least one radioisotope heat source positioned within said reaction chamber and generating sufficient heat energy to maintain said catalyst bed at a temperature sufficient to initiate the rapid reaction of said propellant.

3. A liquid propellant engine comprising:
(A) a reaction chamber including a catalyst bed;
(B) means for injecting at least one liquid propellant into said chamber;
(C) at least one radioisotope heat source positioned peripherally around and thermally coupled to said reaction chamber and generating sufficient heat energy to maintain said catalyst bed at a temperature sufficient to initiate the rapid reaction of said propellant.

4. A liquid propellant engine comprising:
(A) a reaction chamber including a catalyst bed;
(B) means for injecting at least one liquid propellant into said chamber;
(C) at least one radioisotope heat source positioned adjacent said reaction chamber and generating sufficient heat energy to maintain said catalyst bed at a temperature sufficient to initiate the rapid reaction of said propellant;
(D) a nozzle communicating with said reaction chamber.

5. A liquid propellant engine comprising:
(A) a reaction chamber including a catalyst bed;
(B) means for injecting at least one liquid propellant into said chamber;
(C) at least one radioisotope heat source positioned within said reaction chamber and generating sufficient heat energy to maintain said catalyst bed at a temperature sufficient to initiate the rapid reaction of said propellant;
(D) a nozzle communicating with said reaction chamber.

6. A liquid propellant engine comprising:
(A) a reaction chamber including a catalyst bed;
(B) means for injecting at least one liquid propellant into said chamber;
(C) at least one radioisotope heat source positioned peripherally around and thermally coupled to said reaction chamber and generating sufficient heat energy to maintain said catalyst bed at a temperature sufficient to initiate the rapid reaction of said propellant;
(D) a nozzle communicating with said reaction chamber.

7. A liquid monopropellant rocket engine comprising:
(A) a reaction chamber containing a plurality of catalyst pellets;
(B) a spray chamber connected to the inlet end of said reaction chamber and having a spray injector adapted to be connected to a source of propellant;
(C) an outlet chamber connected to the outlet end of said reaction chamber;
(D) an expansion nozzle having a throat section connected to said outlet chamber; and
(E) a radioisotope heat source thermally coupled to said catalyst pellets for generating sufficient heat energy to maintain said catalyst at a temperature to initiate a rapid spontaneous reaction of the propellant.

8. A liquid monopropellant rocket engine comprising:
(A) a reaction chamber containing a plurality of catalyst pellets;
(B) a spray chamber connected to the inlet end of said reaction chamber and having a spray injector adapted to be connected to a source of propellant;
(C) an outlet chamber connected to the outlet end of said reaction chamber;
(D) an expansion nozzle having a throat section connected to said outlet chamber; and
(E) a radioisotope heat source thermally coupled to said catalyst pellets for generating sufficient heat energy to maintain said catalyst pellets at a temperature to initiate a rapid spontaneous reaction of the propellant, said heat source comprising at least one radioisotope capsule embedded within said chamber and catalyst pellets.

9. A liquid monopropellant rocket engine comprising:
(A) a reaction chamber containing a plurality of catalyst pellets;
(B) a spray chamber connected to the inlet end of said reaction chamber and having a spray injector adapted to be connected to a source of propellant;
(C) an outlet chamber connected to the outlet end of said reaction chamber;
(D) an expansion nozzle having a throat section connected to said outlet chamber; and
(E) a radioisotope heat source in thermal contact with said reaction chamber for generating sufficient heat energy to maintain said catalyst at a temperature to initiate a rapid spontaneous reaction of the propellant, said heat source comprising a plurality of radioisotope capsules positioned peripherally around the outside of said reaction chamber.

10. A liquid monopropellant rocket engine comprising:
(A) a reaction chamber containing a plurality of catalyst pellets;
(B) a spray chamber connected to the inlet end of said reaction chamber and having a spray injector adapted to be connected to a source of propellant;
(C) an outlet chamber connected to the outlet end of said reaction chamber;
(D) an expansion nozzle having a throat section connected to said outlet chamber;
(E) a radioisotope heat source thermally coupled to said catalyst pellets for generating sufficient heat energy to maintain said catalyst pellets at a temperature to initiate a rapid spontaneous reaction of the propellant; and
(F) said reaction chamber having a heat resistant insulating coating on its internal surface, and a layer of insulation surrounding said reaction chamber and radioisotope capsule.

11. A rocket engine as set forth in claim 10 wherein said radioisotope heat source is an alpha emitting source of heat energy.

References Cited by the Examiner
UNITED STATES PATENTS

| | | | |
|---|---|---|---|
| 2,930,184 | 3/1960 | Plescia et al. | 60—35.6 |
| 2,975,588 | 3/1961 | Smith | 60—35.6 |
| 2,999,358 | 9/1961 | Zwick | 60—35.6 X |
| 3,049,874 | 8/1962 | Morrow et al. | 60—39.46 X |
| 3,054,252 | 9/1962 | Beckett et al. | 60—35.6 |
| 3,108,054 | 10/1963 | Blackman | 60—35.5 X |
| 3,120,738 | 2/1964 | Webb | 60—35.6 |

OTHER REFERENCES

Zwicky, F.: "Propellants for Tomorrow's Rockets," Astronautics, August 1957, pages 95–96.

Zaehringer, A. J., et al.: "1958 Missile Materials Review," Missiles and Rockets, March 1958, page 74.

Bussard, R. W., et al.: "Nuclear Rocket Propulsion," McGraw-Hill Book Company, Inc., N.Y., 1958, page 317.

"Radioisotope Tube Heater," WADD Technical Report, March 1960, page 53.

MARK NEWMAN, Primary Examiner.

SAMUEL LEVINE, BENJAMIN A. BORCHELT,
Examiners.

D. HART, Assistant Examiner.